United States Patent [19]

Anderson et al.

[11] 4,009,339
[45] Feb. 22, 1977

[54] DEVICE PROVIDING SENSIBLE OUTPUT INDICATING RECEIPT OF DATA BY COMPUTER

[75] Inventors: Richard C. Anderson, Los Altos; Marc G. Mathers, Belmont, both of Calif.

[73] Assignee: Varian Associates, Palo Alto, Calif.

[22] Filed: Feb. 26, 1975

[21] Appl. No.: 553,405

[52] U.S. Cl. .......................... 178/18; 235/151.31; 340/146.1 AB; 340/146.2
[51] Int. Cl.² ................. G06F 11/00; G05B 1/03; G08C 21/00
[58] Field of Search .......... 340/146.1 R, 146.1 AB, 340/172.5, 146.3 ED, 146.2, 253 Z; 235/153 R, 153 A, 153 BN, 153 B; 178/18, 19, 20, 69 G, 23 A

[56] References Cited
UNITED STATES PATENTS

| | | | |
|---|---|---|---|
| 3,478,324 | 11/1969 | Couleur et al. | 340/172.5 |
| 3,496,543 | 2/1970 | Greenly | 340/146.3 ED |
| 3,541,507 | 11/1970 | Duke | 340/146.1 AB |
| 3,644,888 | 2/1972 | Marino | 340/146.1 AB |
| 3,920,973 | 11/1975 | Avellar et al. | 340/146.2 |

*Primary Examiner*—Thomas A. Robinson
*Attorney, Agent, or Firm*—Stanley Z. Cole; Robert K. Stoddard

[57] ABSTRACT

The device, which may be connected either directly to the computer itself or which may form a part of a remotely located input/output station, includes electronic signal generation circuits for generating a signal indicative of the receipt of data being inputted by a human operator, and an error signal indicative that some error in procedure, particularly data input in the wrong mode has been made. These electronic signals are fed to a loudspeaker to produce an audible output.

5 Claims, 1 Drawing Figure

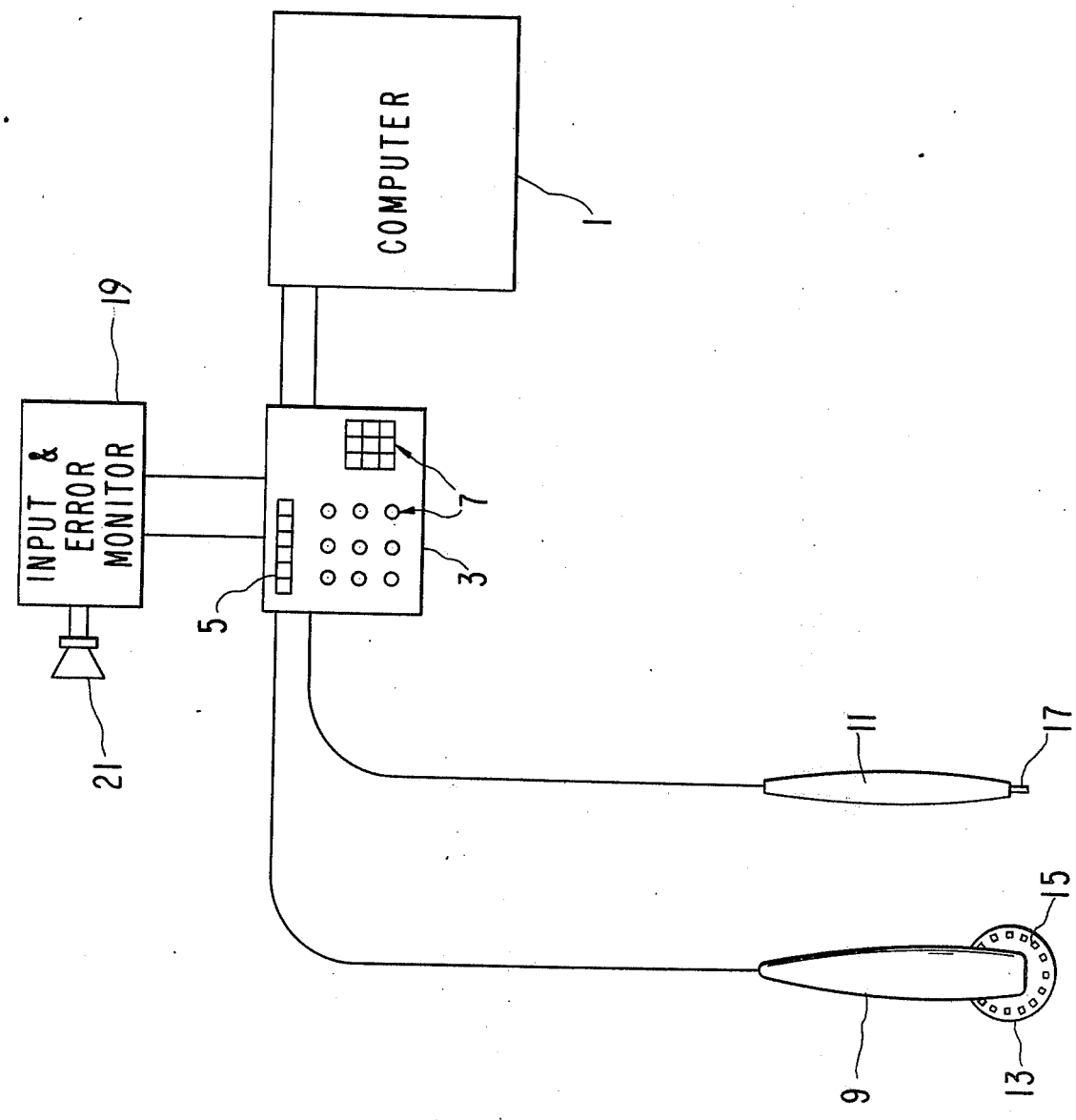

DEVICE PROVIDING SENSIBLE OUTPUT INDICATING RECEIPT OF DATA BY COMPUTER

BACKGROUND OF THE INVENTION

The invention relates in general to input systems wherein a human operator loads input data into a computer. In particular the present invention is concerned with means to provide the human operator with a positive signal or indication that the computer is receiving and recording his data.

In the building construction trades there is a necessity to provide accurate estimates of the cost of construction of new buildings for use in competitive bidding. Since the provision of an accurate cost estimate must take into account the costs of a vast multitude of structural, plumbing, electrical, and other types of purchased equipment, preparing accurate estimates of the costs of such purchased equipment has in the past been a time-consuming and expensive task. The difficulty and expense of estimating have in recent times been aggravated by a manyfold increase in the types and sizes of equipment used in modern construction, and by rapidly changing prices.

Accordingly, general and special purpose computers have come into use in order to adequately store and process the voluminous data required in the preparation of cost estimates. Such computers can easily store the pertinent data concerning a wide range of equipment from manufacturers' catalogues and provide ready access to the information on demand. Furthermore, the mathematical operations required in producing a tabulation of all of the purchased equipment for a large construction job, together with any desired cost breakdown of the materials can easily be performed by the computer.

Nevertheless human operators are required to load the data from the architects' drawings for any given project into the computer in order that it may produce the desired cost estimate. Accordingly in preparing a cost estimate using such a computer system, the estimator must work from blueprints or architects' drawings and insert quantity data for each type of purchased equipment involved. Thus, the operator manually inserts data relating to the number of feet of electrical conduit in the system or the total number of pipe fittings of a given type and size, etc.

Such information can conveniently be inserted into the computer by means of one or more of various types of probes which are electrically connected to the computer and which the operator can hold in his hand as he works on the blueprints. Such probes when manually applied to the drawing produce a signal which is indicative of the quantity data for each category of equipment involved.

Since the insertion of data by this technique involves a certain number of manual operations by the human operator there is always the possibility that, through a fault in the probe, or improper use of the probe on the drawing the data will fail to be inserted into the computer. Furthermore there is the possibility that through improper operation of the computer the operator will attempt to insert information when the computer is not in a condition to receive that information. Finally, lack of any indication from the computer that it is correctly receiving the information being provided by the human operator can often cause apprehension in the mind of the operator and consequently needless rechecking of controls, switches, etc. to be sure that the system is in the correct operative state.

DESCRIPTION OF THE PRIOR ART

U.S. Pat. No., 3,497,959 to Engelsman discloses a probe apparatus which is capable of measuring linear dimensions on a blueprint, map or drawing and converting these dimensions to a digital electrical signal which is registered in a counter. The probe is adjustable to provide various scaling factors for the transformation from the linear dimension to an electrical signal. An adding or marking probe for counting item is also illustrated in FIGS. 4 and 5 of this patent. However there is no suggestion to use the electrical signal produced by the probes as an input to a computer, nor is there any suggestion to provide a means of informing the human operator that the system is accepting data or, alternatively, being incorrectly operated.

U.S. Pat. No. 3,705,956 to Dertouzos illustrates the use of a hand-held probe in combination with a conductive grid (FIG. 5) which generates a signal pulse train corresponding to the movement of the probe, which signal is fed to data processing circuitry or to a display. However, the patent does not suggest the provision of any means to indicate to the user that the data is being correctly loaded into the data processing circuitry.

U.S. Pat. No. 3,680,078 to Baskin et al. utilizes a pair of light pen probes to transfer positional information concerning an object on a cathode ray screen to a computer. In addition to the fact that the purposes of this system are somewhat different from one involving counting and measuring from a blueprint or drawing, no indication is provided to the operator that the information being loaded into the computer is correctly received and entered.

U.S. Pat. No. 3,767,858 to Rogers utilizes an ac energized grid of conductors arranged in linear coordinate fashion to generate a signal in a hand-held probe which signal is representative of the position of the probe on the grid. No means are provided to give the operator feedback information concerning the correct receipt of data in the data utilization apparatus.

U.S. Pat. No. 3,798,370 to Hurst describes a similar system in which the planar coordinates of a point are determined by sampling the electrical potential at the point on a uniformly resistive sheet with a manually held probe. The sheet is energized by spot electrodes in each corner thereof, the electric potential data from the probe being fed to a digital volt meter or data storage or utilization system. Once again no provision is made for informing the operator concerning the correct receipt of the data he is providing.

As can be seen from the above discussion the prior art discloses several different manually operated probe schemes for removing data from a blueprint or drawing or other graphical representation for display, storage, or data processing. However, none of the schemes incorporates a means to provide the operator with reassurance that the information is being correctly received or to the contrary that the display, computer, etc. has not been properly connected, or its mode of operation not properly selected to receive the information.

SUMMARY OF THE INVENTION

The present invention provides a sensible and, in particular, audible indication to the system operator that the data he is providing is being correctly received by a computer or other data utilization means. The means for providing such a sensible indication comprises an input and error monitor circuit connected to or forming a part of the input device for the computer. The monitor circuit which may be connected to the input/output station of the computer or may indeed form an integral part thereof provides an audible tone, especially a "click" or pulse, for each item of data which is inputted to the computer. If the computer input device has not been switched to the correct mode to receive the data an error signal consisting of a tone of a different character, especially a "beep" is emitted to warn the operator that he must establish the correct operating condition in the input device before proceeding further. Thus operator confidence is improved and errors wasteful of time are avoided.

It is therefore a principal object of the present invention to provide a means whereby the operator of a data processing system is informed that the information he is providing to the system is being correctly received.

An additional object of the present invention consists in the provision of a sensible data entry signal to indicate to the operator the receipt of each item of data provided by him to the data processing system;

A further object of the present invention is the provision of a sensible error signal to indicate to the operator of a data processing system that the information being provided is not being received correctly;

A further object of the present invention is the provision of the foregoing signals in such a way that the operator need not look at the system and thus remains free to concentrate on his work.

A further object of the invention is the provision of signal and error indications according to the preceding objects, wherein these indications are in the form of auditory tones.

These and other objects, features and advantages of the present invention will become apparent from a reading of the following portions of the specification.

BRIEF DESCRIPTION OF THE DRAWING

The drawing is a view partially in block diagram form showing the apparatus according to the present invention.

DETAILED DESCRIPTION

Referring to the single figure of the drawing, 1 represents a computer or other data processing apparatus either of a general or special purpose nature which may include, for example, a central processing unit and memory unit. An input/output station 3 which may comprise a desktop console is electrically connected to computer 1 but may be remotely located therefrom. Input/output station 3 may include various display means 5 of the alphanumeric type and a plurality of switches 7 to control the operational mode of the computer and to provide connection of various inputs to the input/output station 3 as desired.

In the drawing a pair of such inputs are illustrated in the form of a length-measuring probe 9 and a counter probe 11. Length-measuring probe 9 includes a measuring wheel 13 mounted in the tip thereof and having a series of apertures 15 provided equispaced around the periphery. As the operator rolls measuring wheel 13 along a line whose length he wishes to enter into computer 1 a light source and photocell (not shown) located in alignment with the series of apertures 15 in length-measuring probe 9 transmit an electrical pulse to input/output station 3 for each aperture 15 which passes the photocell.

Counter probe 11 has a stylus 17 in the form of a ballpoint pen cartridge or insert. When the operator presses stylus 17 against a map or blueprint the stylus retracts slightly into probe 11 closing internal switch contacts (not shown) therein and causing a single corresponding electrical pulse to be transmitted to input-/output station 3. Probes 9 and 11 are known types which are commercially available.

In accordance with the present invention an input and error monitor means 19 is shown connected to input/output station 3, although in practice this means might very well be incorporated within station 3. Input and error monitor means 19 receives an electrical pulse for each signal input pulse coming from either probe 9 or probe 11 and produces an audible tone in loudspeaker 21, which forms a part of the input and error means 19. Also, in accordance with the present invention, monitor means 19 incorporates means for generating an error signal which is indicative that the data being provided by the operator through probe 9 or probe 11 is not being correctly recorded through failure to properly select the mode of operation on station 3, for example. Typically the data entry signal (indicative of correct receipt of data from probes 9 and 11) might simply be a "click" generated in loudspeaker 21 for each separate pulse of input data, whereas the error signal could be a continuous tone or "beep".

In use, the system operator would select the mode of operation of actuating various ones of switches 7 on input/output station 3 such that, for example, probe 9 would be in operation with a scaling factor (computed by the system) of one meter of length for each increment of rotation of measuring wheel 13. Then as probe 9 is used to measure, for example, the total length of conduit shown on a blueprint or architectural drawing one data entry "click" would be produced in loudspeaker 21 for each meter of conduit being added to the total. Alternatively, if probe 11 were selected the system might be programmed to count the number of 90° pipe elbows on the drawing, producing one data entry "click" in loudspeaker 21 for each of the entries. If the operator had incorrectly selected the mode of operation for the system by actuating the wrong switches 7 on station 3 such that the system was not in a condition for receipt of data, then the error signal would be clearly heard from loudspeaker 21, indicating that the system must be correctly programmed before further use.

Thus the operator is continuously informed concerning the receipt by the system of input data. Furthermore, he does not have to look at the system as would be the case if a visible input and error indicator were used. Operator confidence is improved and frustrating, time-consuming errors are eliminated.

Although the invention has been described with some particularly in reference to a preferred embodiment thereof it will be realized that skilled workers in the art may make many modifications within the scope of the invention. Thus it is possible within the scope of the invention to provide that the input and error monitoring function is provided entirely by the software or programming of the system and might include other sensible signals rather than the auditory tones described. Therefore, it is intended that the scope of the invention be interpreted from the following claims.

What is claimed is:

1. In a data processing system having a computer means for receiving, recording and performing mathematical operations upon data, and input means for receiving said data, said input means being connected between a source of said data and said computer means, said source of data being a humanly operable data transducer producing a plurality of discrete units of input data signal in response to the operation thereof by a human operator, THE IMPROVEMENT COMPRISING input monitor means connected to said input means for generating a humanly sensible data entry signal indicative of the receipt by said computer means of said input data signal from said input means, said humanly sensible data entry signal being produced coextensively in time with said input data signal from said source, such that for each said discrete unit of said input data signal a discrete unit of said humanly sensible data entry signal is produced, whereby said human operator is provided with a confidence check for the receipt of data being inputted to the system.

2. The apparatus according to claim 1 wherein said humanly sensible data entry signal is an auditory tone.

3. The apparatus according to claim 1 wherein said monitor means includes an error signal means for generating a humanly sensible error signal indicative of transmission of data from said source under circumstances when said input means is not in a condition to receive said data.

4. The apparatus according to claim 1 wherein each of said discrete units of said input data signal comprises an electrical pulse, and each of said discrete units of said humanly sensible data entry signal comprises an auditory tone generated by said monitor means.

5. The apparatus according to claim 4 wherein said humanly operable transducer comprises a manually operable probe means for producing said electrical pulses in response to manual application of said probe to a solid surface, whereby said probe can be used to produce information in electrical pulse form concerning objects pictorially represented in drawings.

* * * * *